(12) United States Patent
Tomter

(10) Patent No.: US 9,685,897 B2
(45) Date of Patent: Jun. 20, 2017

(54) ELECTRICAL GEAR AND METHOD FOR OPERATING A SUBSEA MACHINERY ROTATING AT HIGH SPEED

(71) Applicants: VETCO GRAY SCANDINAVIA AS, Sandvika (NO); Ole Petter Tomter, Sandvika (NO)

(72) Inventor: Ole Petter Tomter, Sandvika (NO)

(73) Assignee: Vetco Gray Scandinavia AS, Sandvika (NO)

( * ) Notice: Subject to any disclaimer, the term of this patent is extended or adjusted under 35 U.S.C. 154(b) by 270 days.

(21) Appl. No.: 14/358,082

(22) PCT Filed: Nov. 14, 2012

(86) PCT No.: PCT/IB2012/002351
§ 371 (c)(1),
(2) Date: May 14, 2014

(87) PCT Pub. No.: WO2013/072741
PCT Pub. Date: May 23, 2013

(65) Prior Publication Data
US 2014/0320055 A1     Oct. 30, 2014

(30) Foreign Application Priority Data
Nov. 14, 2011    (EP) ..................................... 11009028

(51) Int. Cl.
*H02P 27/00*     (2006.01)
*H02K 47/20*     (2006.01)
(Continued)

(52) U.S. Cl.
CPC ............. *H02P 27/00* (2013.01); *H02K 47/20* (2013.01); *H02M 5/32* (2013.01); *H02P 17/00* (2013.01); *H02P 23/0086* (2013.01)

(58) Field of Classification Search
CPC ...... H02P 27/00; H02P 17/10; H02P 23/0086; H02K 47/20; H02M 5/32
(Continued)

(56) References Cited

U.S. PATENT DOCUMENTS

| | | | | |
|---|---|---|---|---|
| 2,557,901 A | * | 6/1951 | Wiseman | H02K 47/20 363/9 |
| 3,237,086 A | * | 2/1966 | Krasnow | B65D 90/30 322/16 |

(Continued)

FOREIGN PATENT DOCUMENTS

| | | |
|---|---|---|
| CH | 379624 A | 7/1964 |
| CN | 1202034 A | 12/1998 |

(Continued)

OTHER PUBLICATIONS

EP Search Report, dated May 11, 2012, issued in connection with corresponding EP application 11009028.9 11009028.9.

(Continued)

*Primary Examiner* — Rita Leykin
(74) *Attorney, Agent, or Firm* — GE Global Patent Operation

(57) ABSTRACT

An electrical gear configured to supply electrical drive power to a machinery to be rotated at high speed, such as a subsea motor/pump or a subsea motor/compressor assembly, the electrical gear including a high input voltage AC-motor having a low pole number, the AC-motor drivingly connected to a medium output voltage AC-generator having inverted design, wherein in the AC-generator the field windings are supported on a rotor which is journalled for rotation inside an outer stator carrying a high number of magnet poles, the AC-motor is configured to run on high voltage alternating current at a first frequency, and the AC-generator is configured to deliver medium voltage alternating current (Continued)

at a second frequency, higher than said first frequency, to an AC-motor to be energized having a low pole number.

19 Claims, 3 Drawing Sheets

(51) Int. Cl.
  *H02M 5/32* (2006.01)
  *H02P 17/00* (2006.01)
  *H02P 23/00* (2016.01)
(58) Field of Classification Search
  USPC ....... 318/503, 504, 140, 147, 153, 149, 151, 318/157, 158, 156, 743; 320/134; 363/35; 307/11, 12, 151, 9.1; 310/113, 310/12.2, 12, 13, 102 R, 171; 114/382; 322/14, 15, 16
  See application file for complete search history.

(56) References Cited

U.S. PATENT DOCUMENTS

| | | | | |
|---|---|---|---|---|
| 3,754,174 | A * | 8/1973 | Shibata | H02P 29/0027 318/801 |
| 5,154,741 | A * | 10/1992 | da Costa Filho | E21B 43/36 166/357 |
| 5,886,418 | A * | 3/1999 | Kondo | F02B 1/045 307/9.1 |
| 6,135,723 | A * | 10/2000 | Hatton | F04C 2/16 417/251 |
| 6,327,994 | B1 * | 12/2001 | Labrador | B01D 61/10 114/382 |
| 6,680,856 | B2 * | 1/2004 | Schreiber | H02M 5/458 307/82 |
| 6,825,575 | B1 * | 11/2004 | Edelson | B60L 11/04 290/40 B |
| 7,821,145 | B2 * | 10/2010 | Huang | F02N 11/04 290/31 |
| 7,911,175 | B2 * | 3/2011 | Fargo | H02K 17/06 310/179 |
| 8,097,810 | B2 * | 1/2012 | Benestad | H01B 17/30 174/152 R |
| 8,692,408 | B2 * | 4/2014 | Zhang | H02M 5/458 307/12 |
| 8,896,252 | B2 * | 11/2014 | Yamada | B60L 15/20 318/400.26 |
| 9,214,816 | B2 * | 12/2015 | Batho | E21B 41/0007 |
| 2006/0228957 | A1 * | 10/2006 | Matic | B63H 11/08 440/38 |
| 2007/0222220 | A1 * | 9/2007 | Huang | F02N 11/04 290/31 |
| 2009/0045687 | A1 | 2/2009 | Yu et al. | |
| 2010/0039060 | A1 * | 2/2010 | Fargo | H02K 17/06 318/776 |
| 2010/0283252 | A1 * | 11/2010 | Fradella | H02K 1/2793 290/55 |
| 2011/0187307 | A1 * | 8/2011 | Coldwate | H02K 17/14 318/777 |
| 2011/0247825 | A1 | 10/2011 | Batho et al. | |
| 2013/0200691 | A1 * | 8/2013 | Crane | B63H 23/24 307/9.1 |

FOREIGN PATENT DOCUMENTS

| | | |
|---|---|---|
| EP | 2179879 A | 4/2010 |
| FR | 1375986 A | 10/1964 |
| GB | 725795 A | 3/1955 |
| WO | 0126201 A1 | 4/2001 |
| WO | 0126754 A1 | 9/2001 |
| WO | 0169754 A1 | 9/2001 |

OTHER PUBLICATIONS

PCT Search Report and Written Opinion dated Apr. 11, 2014, issued in connection with corresponding PCT application PCT/IB2012/002351.
Australia Office Action issued in connection with corresponding AU Application No. 2012338522 on Aug. 15, 2016.

* cited by examiner

ELECTRICAL GEAR AND METHOD FOR OPERATING A SUBSEA MACHINERY ROTATING AT HIGH SPEED

BACKGROUND OF THE INVENTION

Embodiments of the present invention relate to power supply for machinery rotating at high speed in general, and relate specifically to an electrical gear for subsea machinery to be run at high rotational speed. More precisely, embodiments of the present invention relate to an electrical gear that effects transformation of AC-voltage and frequency of the electrical power supplied to machinery that is to be rotated at high speed. In analogy herewith, embodiments of the present invention also relate to a method for operating a high speed rotating machinery. Embodiments of the present invention are particularly useful for power supply to electric motors in subsea pumps or compressors located at long offset distances from an offshore platform or land based facility.

Asynchronous or synchronous electrical motors are typically supplied alternating current (AC) at an oscillation rate or frequency that provides the required rotational speed based on the number of magnet poles in the motor. Since at least two poles are required to generate rotation, the motor speed is the product of 120 and the voltage frequency in Hz (oscillations per second), divided by the number of poles 2, 4 or 6, etc. A voltage frequency of 300 Hz is thus required if a motor speed of 9,000 rpm is desired from a 4-pole motor. As for the asynchronous motor the speed will be slightly slower due to slip while the synchronous motor provides full torsional effect as it runs in synchronization with the alternating magnetic field, and thus maintains its rotational speed also under load, up to a maximum load.

In subsea operations, long distance transmission cables are often required to supply electrical power from a sea- or land-based platform to pumps and compressors located subsea. However, long distance transmission of AC-power at voltages and frequencies adapted for fast running synchronous motors demands for extraordinary and costly measures to avoid transmission losses in voltage and power. A method for avoiding high power losses in subsea operation is to implement a complex subsea Variable Frequency Drive (VFD) at the cable end close to the machinery. The VFD rectifies the incoming 3-phase power and modulates a high frequency output power by using controlled power electronics semiconductor devices such as insulated gate bipolar transistors (IGBT), e.g. The VFD will also comprise an inlet transformer for voltage step-down.

High voltage alternating current at frequencies of 50 or 60 Hz is typically available on the platforms (where they also can be converted to lower frequencies by implementation of a platform VFD). Thus in order to avoid losses resulting from long distance transmission of electrical power in subsea operation, electrical power is regularly supplied at a voltage and frequency that require transformation and regulation to fit the specification of an electrical motor running at high speed. As used in this specification, the term "high voltage" refers to a voltage of 10,000 V and above, whereas "medium voltage" refers to a voltage below 10,000 V.

SUMMARY OF THE INVENTION

The object of the present invention is to provide a reliable and structurally non-complex electrical gear and method of operation that reduces long distance power losses and/or also avoids the electrical appliances which have hitherto been required for operation of high speed rotating machinery, such as pumps or compressors in subsea installations, e.g.

To meet the object, embodiments of the present invention make use of an electrical gear comprising a high input voltage AC-motor having a low pole number; a medium output voltage AC-generator having a high pole number, wherein the AC-motor is drivingly connected to the AC-generator, and wherein the AC-motor is configured to run on high voltage alternating current at a first frequency, and the AC-generator is configured to deliver medium voltage alternating current at a second frequency, higher than said first frequency, to a motor to be energized.

In other words, the supplied electrical power is mechanically or electro-mechanically converted to a voltage and frequency which are rated to provide the desired rotational speed in a motor that drives a rotating machinery.

In subsea operation, the presented solution avoids the need for pressure-compensated installation of transformers and VFD-converters, as well as the VFD-control otherwise required.

In order to secure an output voltage that is stable in frequency, the AC-generator is, in an embodiment, fixedly coupled to the high input voltage AC-motor via a common shaft. This embodiment also facilitates a compact overall structure.

More precisely, in embodiments of the present invention, the high input voltage AC-motor, the AC-generator and a medium input voltage AC-motor are arranged on a common geometrical axis of rotation. Thus, the entire electrical gear can be housed inside a common pressurized or pressure-compensated housing as a subsea unit, in alignment with a subsea pump or compressor, e.g.

In order to accommodate a higher number of poles in the AC-generator, in an embodiment, the AC-generator is given inverted design. In this embodiment the field windings are supported on a journaling rotor rotating inside a stator which is carrying the magnet poles. An electrical collector, such as a slip ring collector, e.g., is arranged to pick up the voltage generated in the journaling rotor.

In another embodiment, the high input voltage AC-motor is via a primary shaft drivingly connected to a rotor of an AC-generator having inverted design, the outer stator carrying the magnet poles. The rotor of the AC-generator is via a secondary shaft drivingly connected to a rotor in a motor to be energized, the energized motor likewise having inverted design, and the rotors carrying the field windings thus being mechanically coupled and co-rotating. The field windings on the rotors of the AC-generator and the energized motor are also electrically interconnected. The rotor of the energized motor is journalled for rotation inside a journaling outer stator carrying the magnet poles, the journaling outer stator drivingly connected to the driven machinery via an output shaft.

The rotation of the primary shaft will this way add on to the rotation of the output shaft, as the journaling outside stator of the energized motor is biased by the rotation of the encircled journaling rotor.

By proper choice of number of magnet poles in the AC-motor, in the AC-generator and in the energized motor, the electrical gear can be designed to deliver output speeds adapted for fast rotating machinery, such as subsea pumps or compressors.

In practice, the high input voltage AC-motor may be configured to run on alternating current at a voltage above 10 kV, more particularly, in the range of 16-32 kV, at a first frequency of 10 to 60 Hz. The AC-generator may be configured to deliver alternating current at a voltage below 10 kV, more particularly, in the range of 5-8 kV, at a second frequency of 200 to 360 Hz, and the energized motor can be configured to deliver an output speed of 9,000 to 13,800 rpm, e.g.

The electrical gear of the present invention also results in a method of operating a machinery to be rotated at high speed, such as a subsea motor/pump or a motor/compressor assembly, e.g. The method comprises: drivingly connecting a high input voltage AC-motor having a low pole number to a medium output voltage AC-generator of inverted design and having a high pole number; feeding high voltage alternating current at a first frequency to the AC-motor; retrieving medium voltage alternating current at a second frequency, higher than said first frequency, from the AC-generator; and feeding the medium voltage alternating current at the second frequency from the AC-generator to a motor to be energized, the energized motor having a low pole number.

The method, in an embodiment, comprises arranging the AC-motor, the AC-generator and the energized motor on a common geometrical axis of rotation.

The method, in an embodiment, comprises providing an AC-generator of inverted design and connecting the AC-motor with the rotor in the AC-generator and retrieving, by means of an electrical slip ring collector, voltage at the second frequency induced in field windings supported on the journaling rotor.

The method, in an embodiment, comprises mechanically and electrically connecting the rotor of the AC-generator having inverted design with the rotor of an energized motor having inverted design, connecting the rotating machinery with a journaling stator that rotates about the journaling rotor of the energized motor, adding this way the rotational speed of the AC-motor to the induced rotation of the journaling outside stator of the energized motor.

BRIEF DESCRIPTION OF THE DRAWINGS

Embodiments of the present invention will be more closely described below with reference to the appended, schematic drawings. In the drawings.

DETAILED DESCRIPTION

Figure 1:
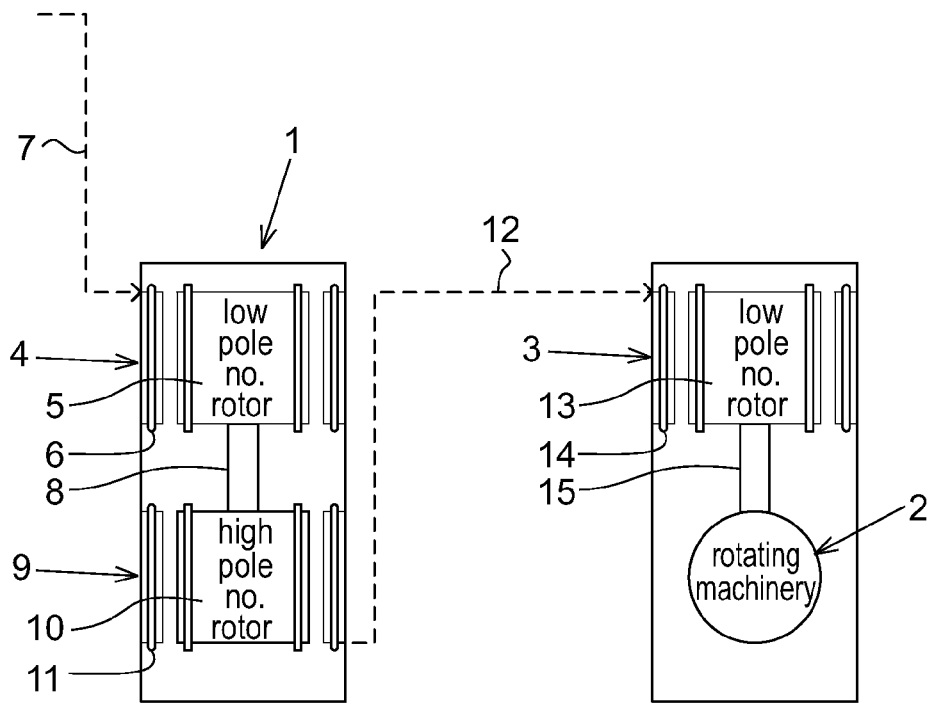
FIG. 1 illustrates a setup of an electrical gear supplying power to a rotating machinery.

In the drawings, the electrical gear is generally named by reference number 1. Reference number 2 denotes a machinery to be operated at high rotational speed, in the orders of 5,000, 10,000 or 15,000 revolutions per minute, e.g. The rotating machinery can be a subsea pump or compressor driven by an operating electrical motor 3.

The electrical gear 1 is configured to mechanically step down a supplied AC-voltage into a lower output AC-voltage, and to gear up the frequency in the voltage supplied to a higher frequency delivered for energizing the motor 3 driving the rotating machinery.

The electrical gear 1 comprises an alternating current motor 4 comprising a rotor 5 encircled by a stator 6 to which electrical power is supplied via an electric cable 7. The AC-motor 4 is arranged to run on high input voltage in the order of 16-32 kV at a frequency of 10 to 60 Hz. The input voltage may be delivered from a sea- or land-based platform used in subsea operation. The AC-motor 4 is equipped with a low number of magnet poles, such as 2 or 4, supported in the rotor 5. The rotor 5 may for example carry 2 magnet poles, generating an output speed of 3,000/3,600 revolutions per minute on the output shaft 8 from the AC-motor 4.

In the embodiment illustrated in FIG. 1 the AC-motor 4 is drivingly connected to an alternating current (AC)-generator 9. More precisely, the output shaft 8 from the AC-motor is fixedly connected to a rotor 10 encircled by a stator 11 of the AC-generator.

The AC-generator 9 is configured to deliver a medium output voltage below 10,000 V required for energizing the motor 3 in the rotary machinery 2. The AC-generator 9 may for example be configured to supply an AC-voltage of 6.6 kV to the energized motor 3 via power supply connection 12. The AC-generator 9 is equipped with a high number of magnet poles, such as 10 or more, supported in the rotor 10. The rotor 10 may for example carry 12 magnet poles, generating an output frequency of 200 to 360 Hz in the AC-voltage delivered to the energized motor 3.

The energized motor 3 is configured to receive and run on medium input AC-voltage, such as 6.6 kV, e.g. The energized motor 3 has a rotor 13 encircled by a stator 14. The rotor 13 is equipped with a low number of magnet poles, such as 2 or 4. The rotor 13 may for example carry 4 magnet poles generating an output speed of 9,000/10,800 rpm, which is delivered to the rotating machinery via an output shaft 15.

Naturally, the above specifications are given as examples to illustrate a potential and advantageous implementation of the electrical gear in fast-running machinery. By proper choice of input voltage frequency and pole numbers in the three units other output speeds are of course available, both above and below the ranges mentioned in this specification.

As used herein for the purpose of separating a low pole number from a high pole number, any pole number below 6, such as 2 or 4, may be referred to as a low number of magnet poles, whereas a high pole number may be referred to 8 magnet poles, or any pole number above 8.

Figure 2:
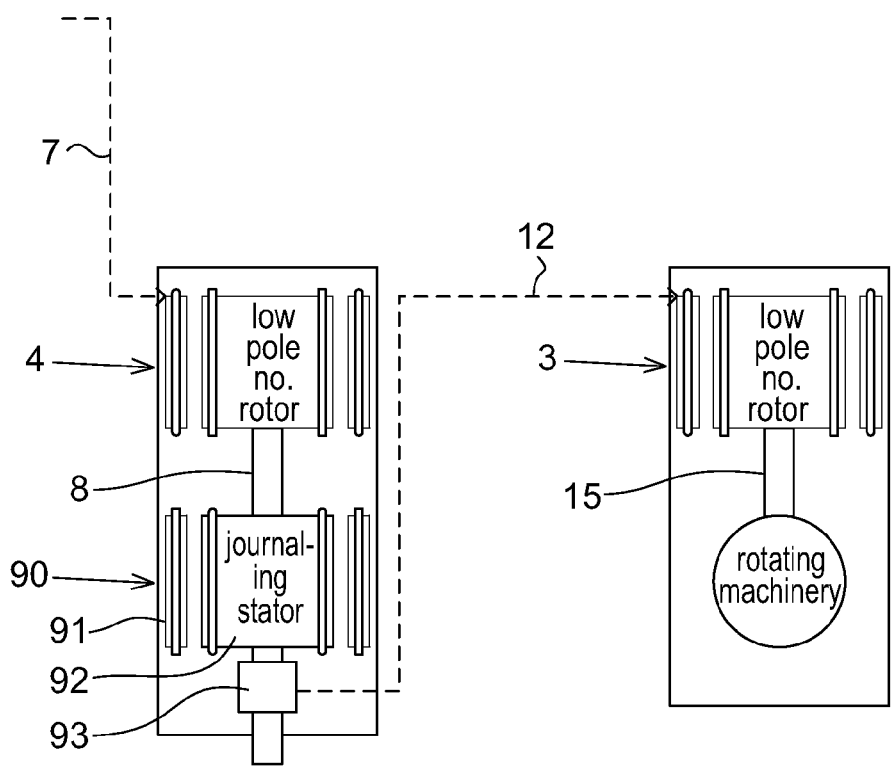
FIG. 2 illustrates an alternative embodiment of the electrical gear illustrated in FIG. 1.

The embodiment illustrated in FIG. 2 differs from the previous embodiment with respect to the configuration of the AC-generator 90, having in this case an inverted design. More precisely, in the AC-generator 90 a higher number of magnet poles are supported on the outer stator 91, whereas the field windings are carried on an inner journaling rotor 92, driven in rotation by the output shaft 8 from the AC-motor 4. An electrical slip ring collector 93 is arranged about the rotor or rotor axis to pick up voltage generated in the field windings. The generated AC-voltage is supplied to the energized motor 3 via power supply connection 12.

Figure 3A:
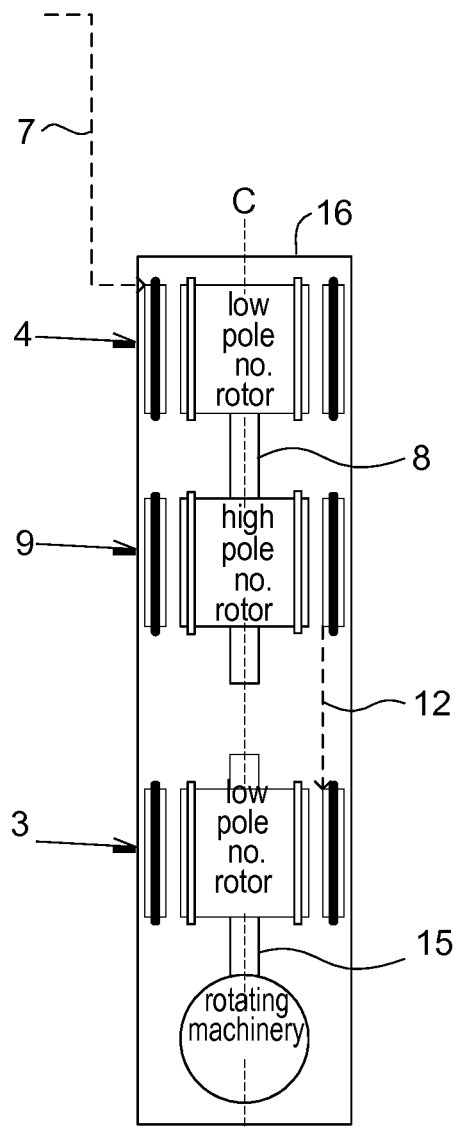
FIGS. 3A and 3B illustrate electrical gear components and rotating machinery in a common housing.
Figure 3B:
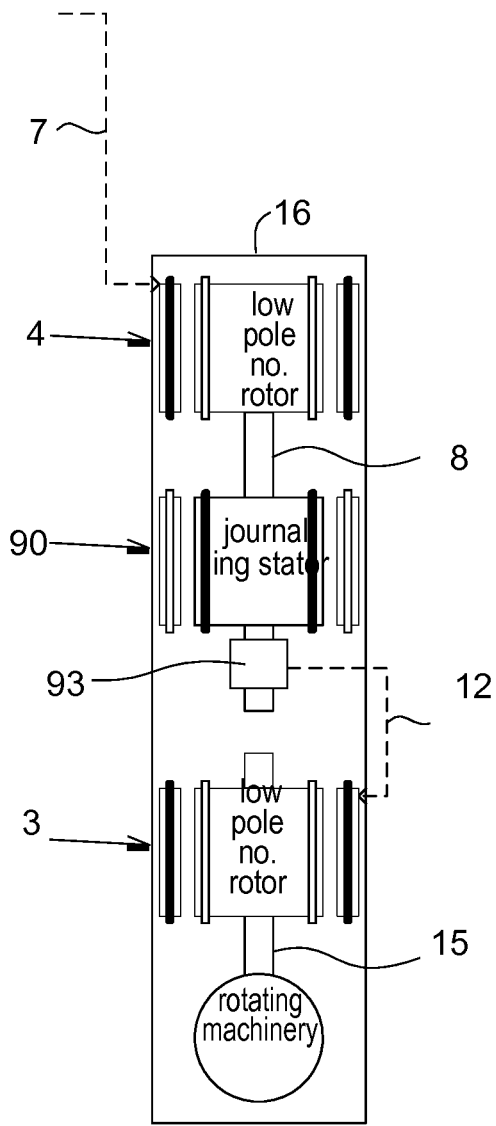

FIGS. 3A and 3B illustrate the straight-forward and inverted designs, respectively, explained with reference to FIGS. 1 and 2. In FIGS. 3A and 3B the AC-motor 4, the AC-generator 9 or 90 and the energized motor 3 are aligned on a common geometrical axis of rotation C. A compact assembly is this way achieved which can be built into a common housing 16 as a unit.

In accordance with a particularly embodiment in a subsea implementation of the electrical gear, the housing 16 constitutes a pressurized or pressure-compensated vessel 16. The pressure vessel 16 may be arranged for connection to a subsea pump or subsea compressor to be driven by the energized motor 3 of the electrical gear. The pressure vessel 16 may optionally be configured for housing also the subsea pump or compressor inside its pressure-resistant shell.

Figure 4:
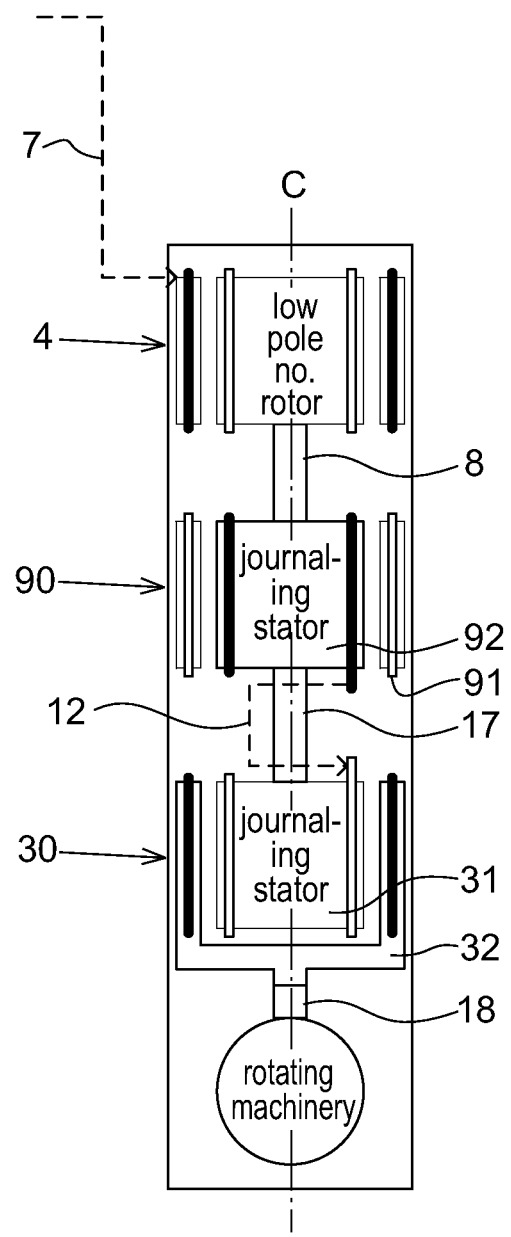
FIG. 4 illustrates a further developed embodiment of the electrical gear and rotating machinery.

In the embodiment illustrated in FIG. 4, the output rotational speed of the high input voltage AC-motor 4 is added to the output speed delivered from the energized motor. In other words, an additional speed in the order of 3,000 rpm, e.g., may this way be added to the output rotational speed of the energized motor.

More precisely, in the embodiment of FIG. 4 the AC-motor 4 drives a rotor 92 of the AC-generator 90 having inverted design in co-rotation with a rotor 31 of an energized motor 30, the energized motor 30 likewise having inverted design. The output shaft 8 from the AC-motor 4 forms a primary shaft 8 connecting the AC-motor with the rotor 92 which rotates inside a stator 91 carrying a high number of magnet poles. A secondary shaft 17 forms a fixed connection between the rotors 92 and 31. In other words, the AC-motor 4, the inverted AC-generator 90 and the inverted energized motor 30 are all mechanically interconnected and co-rotating at the same rotational speed. The field windings supported on the rotors 92 and 31 are electrically interconnected through the power supply connection 12. The rotor 31 rotates inside an outside stator 32 carrying a low number of magnet poles, such as 2 or 4 magnet poles, e.g. The outside stator 32 is however not stationary, but is journalled for rotation and is thus biased in rotation by the rotational speed of the rotor 31. An output shaft 18 forms a driving connection between the journaling outer stator 32 and the rotating machinery.

Also other modification than those explained through the illustrated embodiments are possible. All those modifications which can be derived from the teachings presented hereinabove are encompassed in the scope of the present invention and embodiments thereof as defined by the appended claims.

What is claimed is:

1. An electrical gear configured to supply electrical power to a subsea machinery to be rotated at high speed, the electrical gear comprising:
a high input voltage AC-motor having a low pole number; and
a medium output voltage AC-generator of inverted design,
wherein the high input voltage AC-motor is drivingly connected to the medium output voltage AC-generator,
wherein, in the medium output voltage AC-generator, field windings are supported on a rotor journaled for rotation inside an outer stator carrying a high number of magnet poles, and
wherein the high input voltage AC-motor is configured to run on high voltage alternating current at a first frequency, and the medium output voltage AC-generator is configured to deliver medium voltage alternating current at a second frequency, higher than the first frequency, to a motor to be energized, wherein the energized motor has a low pole number.

2. The electrical gear of claim 1, wherein an electrical slip ring collector is configured to pick up the voltage generated in the field windings supported on the rotor of the medium output voltage AC-generator.

3. The electrical gear of claim 1, wherein the high input voltage AC-motor, the medium output voltage AC-generator, and a medium input voltage AC-motor are arranged on a common geometrical axis of rotation.

4. The electrical gear of claim 1, wherein the high input voltage AC-motor and the medium output voltage AC-generator are arranged within a common housing.

5. The electrical gear of claim 1, wherein the high input voltage AC-motor (4), the medium output voltage AC-generator, and the energized motor are arranged within a common housing.

6. The electrical gear of claim 1, wherein the high input voltage AC-motor, the medium output voltage AC-generator, the energized motor, and the rotating subsea machinery are arranged within a common housing.

7. The electrical gear of claim 4, wherein the housing is a pressurized or a pressure-compensated subsea vessel.

8. The electrical gear of claim 1, wherein:
the high input voltage AC-motor, the rotor of the medium output voltage AC-generator, and a rotor of the energized motor having inverted design are mechanically interconnected for co-rotation at the same rotational speed,
the rotors of the medium output voltage AC-generator and the energized motor are electrically interconnected, and
the rotor of the energized motor is journaled for rotation inside a journaling outer stator of the energized motor drivingly connected to the subsea machinery to be rotated via an output shaft, adding the rotational speed of the high input voltage AC-motor to the induced rotation of the journaling outer stator of the energized motor.

9. The electrical gear of claim 8, wherein the high input voltage AC-motor, the medium output voltage AC-generator, and the energized motor are arranged within a common housing.

10. The electrical gear of claim 8, wherein the high input voltage AC-motor, the medium output voltage AC-generator, the energized motor, and the rotating subsea machinery are arranged within a common housing.

11. The electrical gear of claim 9, wherein the housing is a pressurized or a pressure-compensated subsea vessel.

12. The electrical gear of claim 1, wherein the high input voltage AC-motor is further configured to run on alternating current at a high voltage above 10 kV at the first frequency of 10 or 60 Hz.

13. The electrical gear of claim 12, wherein the medium output voltage AC-generator is configured to deliver alternating current at a voltage below 10 kV at the second frequency of 100-300 Hz or 360 Hz.

14. The electrical gear of claim 13, wherein the energized motor delivers an output speed of 9,000 to 13,800 rpm.

15. A method of operating a subsea machinery at high rotational speed, the method comprising:
drivingly connecting a high input voltage AC-motor having a low pole number to a medium output voltage AC-generator having inverted design, wherein, in the medium output voltage AC-generator, field windings are supported on a rotor journaled for rotation inside an outer stator carrying a high number of magnet poles;
feeding high voltage alternating current at a first frequency to the high input voltage AC-motor;
retrieving medium voltage alternating current at a second frequency, higher than the first frequency, from the medium output voltage AC-generator; and
feeding the medium voltage alternating current at the second frequency from the medium output voltage AC-generator to a motor to be energized, wherein the energized motor has a low pole number.

16. The method of claim 15, further comprising retrieving voltage at the second frequency from the rotor of the medium output voltage AC-generator by an electrical slip ring collector.

17. The method of claim 15, further comprising arranging the high input voltage AC-motor, the medium output voltage AC-generator, and the energized motor on a common geometrical axis of rotation.

18. The method of claim 15, further comprising:
mechanically and electrically connecting the rotor of the medium output voltage AC-generator with a journaling rotor of the energized motor having inverted design;
connecting the rotating subsea machinery with a journaling outer stator journaled for rotation about the journaling rotor of the energized motor; and
adding the rotational speed of the high input voltage AC-motor to the induced rotation of the journaling outer stator of the energized motor.

19. The method of claim 15, further comprising arranging the high input voltage AC-motor, the medium output voltage AC-generator, the energized motor, and the rotating subsea machinery within a common housing, wherein the housing is a pressurized or a pressure-compensated vessel.

\* \* \* \* \*